United States Patent
McDonald et al.

(10) Patent No.: US 6,411,816 B1
(45) Date of Patent: Jun. 25, 2002

(54) METHOD OF REGISTRATION IN A COMMUNICATION SYSTEM

(75) Inventors: Daniel J. McDonald, Cary; Marc Cassidy, Fox River Grove; Randy L. Ekl, Lake Zurich; John Mistro, Lake in the Hills; Erick Loven, Urbana, all of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/597,342

(22) Filed: Jun. 19, 2000

Related U.S. Application Data

(63) Continuation-in-part of application No. 08/976,975, filed on Nov. 25, 1997, now Pat. No. 6,119,017.

(51) Int. Cl.[7] .............................. H04B 7/00; H04Q 7/20
(52) U.S. Cl. ...................... 455/518; 455/435; 455/519
(58) Field of Search .............................. 455/518, 519, 455/517, 527, 520, 432, 435, 521–404, 434; 340/825.52, 10.2, 10.32

(56) References Cited

U.S. PATENT DOCUMENTS

| | | | |
|---|---|---|---|
| 5,097,499 A | * 3/1992 | Cosentino | 455/435 |
| 5,134,714 A | * 7/1992 | Janzen et al. | 455/512 |
| 5,168,575 A | * 12/1992 | Cizek et al. | 455/514 |
| 5,226,071 A | * 7/1993 | Bolliger et al. | 455/435 |
| 5,287,552 A | * 2/1994 | Sasuta et al. | 455/518 |
| 5,387,905 A | * 2/1995 | Grube et al. | 340/825.52 |
| 5,410,740 A | * 4/1995 | Hagstrom | 455/67.1 |
| 5,442,634 A | * 8/1995 | Cizek | 370/329 |
| 5,574,728 A | * 11/1996 | Mamaghani et al. | 370/462 |
| 5,729,542 A | * 3/1998 | Dupont | 370/346 |
| 5,850,611 A | * 12/1998 | Krebs | 455/518 |
| 5,905,960 A | * 5/1999 | Nicholl et al. | 455/450 |
| 6,052,578 A | * 4/2000 | McWeeny et al. | 455/414 |
| 6,119,017 A | * 9/2000 | Cassidy et al. | 455/518 |

* cited by examiner

*Primary Examiner*—Vivian Chin
*Assistant Examiner*—Charles N. Appiah
(74) *Attorney, Agent, or Firm*—Susan L. Lukasik; Steven R. Santema

(57) ABSTRACT

A method of registration in a communication system includes the steps of detecting (201) an elevated registration level of at least a part of a communication system, selecting (203) a group recovery time, determining (205) a first random registration time that is less than or equal to the group recovery time, registering (209) a first communication unit (111) from a first talkgroup at the first random registration time, and upon receiving (212) a group activity message for the first talkgroup, delaying (213) registration by at least a second communication unit (113) from the first talkgroup.

7 Claims, 3 Drawing Sheets

METHOD OF REGISTRATION IN A
COMMUNICATION SYSTEM

CROSS REFERENCE TO RELATED APPLICATIONS

This application is a continuation-in-part of commonly-assigned U.S. application Ser. No. 08/976,975, titled "METHOD OF REGISTRATION IN A COMMUNICATION SYSTEM" and filed on Nov. 25, 1997 now U.S. Pat. No. 6,119,017 on behalf of Marc Cassidy, Daniel J. McDonald, and Randy L. Ekl, the disclosure of which prior application is hereby expressly incorporated by reference, verbatim, and with the same effect as though such disclosures were fully and completely set forth herein.

FIELD OF THE INVENTION

This invention relates to communication unit frequency (RF) communication systems, including but not limited to transmission of messages in RF communication systems.

BACKGROUND OF THE INVENTION

The basic operation and structure of a land mobile communication unit system is well known. Land mobile communication unit systems typically comprise one or more communication units (e.g., vehicle-mounted or portable communication units in a land mobile system and communication unit/telephones in a cellular system) and one or more repeaters that transceive information via the RF communication resources. These communication resources may be narrow band frequency modulated channels, time division multiplex slots, frequency pairs, and so forth. Land mobile communication unit systems may be organized as trunked communication systems, where a plurality of communication resources is allocated amongst a group of users by assigning the repeaters on a communication-by-communication basis within an RF coverage area.

Large communication systems comprising a large number of communication units are known to exist. At times, when a site failure occurs in such a system, the communication units that are presently registered at a failed site will want to affiliate or register with an adjacent site in order to avoid being isolated from their group communications. At times, however, it is possible that a very large number of communication units will try to re-register at an adjacent site in a very short time frame, causing the control channel on which registration takes place to become flooded with requests and the site may subsequently become incapable of processing any requests, including normal communication requests.

At other times, there may be a need for a large number of communication units to transmit messages on a single channel in a short period of time. In a broadcast data system, a single transmission may target numerous receiving communication units, sometimes thousands of units. Because each of the units must send either an ACK (acknowledgment) or a NACK (negative acknowledgment) for each data frame, the return channel becomes inundated with thousands of messages, consuming valuable time on the communication channel. If use of the return channel is not coordinated, many of these messages are likely to coincide at least partially, resulting in corrupted ACKs and NACKs, rendering the transmitter unable to distinguish which messages were received successfully and which ones were not. One method for returning ACKs and NACKs via a return channel in a coordinated manner is to designate a particular time interval for each unit to transmit an ACK/NACK. When there are numerous communication units, such a system is wasteful of the communication channel, and messages will take a very long time to be transmitted.

Accordingly, there is a need for a method of coordinating transmission of a large number of messages on a single channel in an orderly fashion, such that all messages are received without taking an extraordinary amount of time or flooding the channel to such degree that the communication site becomes unusable.

DESCRIPTION OF A PREFERRED EMBODIMENT

Figure 1:
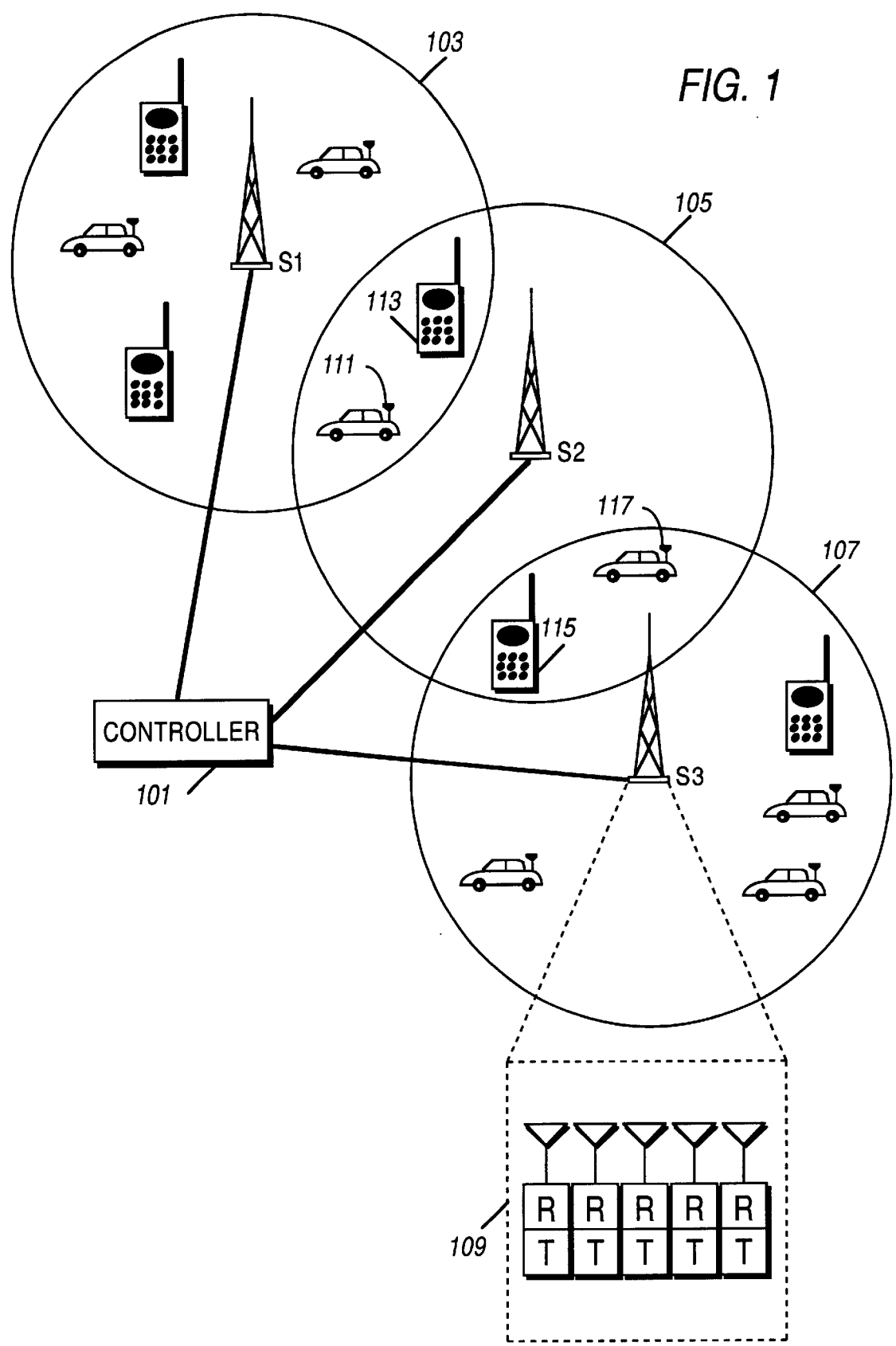
FIG. 1 is a block diagram of a communication system in accordance with the invention.

The following describes an apparatus for and method of scheduling or coordinating transmission of a large number of messages on a single channel in an orderly fashion. In the case where a large number of communication units need to register in a system, messages are coordinated such that at least one communication unit of each talkgroup in the system is quickly registered, thereby enabling talkgroup activity to take place, and the remaining unregistered communication units are then expediently registered by transmitting their registration messages. All messages are received without taking an extraordinary amount of time or flooding the channel to such degree that the communication site becomes unusable.

A method of the present invention comprises the steps of detecting an elevated registration level of at least a part of a communication system, selecting a first time, determining a first random registration time that is less than or equal to the first time, registering a first communication unit from a first talkgroup at the first random registration time, and upon receiving a group activity message for the first talkgroup, delaying registration by at least a second communication unit from the first talkgroup. The method may additionally comprise the steps of selecting a second time, determining a second random registration time that is less than or equal to the second time, registering a first communication unit from a second talkgroup at the second random registration time, and upon receiving a registration acknowledgment for the second talkgroup, delaying registration by at least a second communication unit from the second talkgroup. The method may further comprise the steps of detecting a group activity message from each intended talkgroup of a plurality of talkgroups, selecting a third time, determining a third random registration time that is less than or equal to the third time, and registering at the third random registration time.

Another method of the present invention comprises the steps of detecting, by a controller, an elevated registration level of at least a part of a communication system, selecting a first time, broadcasting the first time to a plurality of communication units, receiving a registration from a first communication unit of a first talkgroup, and sending a registration acknowledgment to the first communication unit of the first talkgroup. The method may additionally comprise the steps of selecting a second time, broadcasting the second time to the plurality of communication units, receiving a registration from a first communication unit of a second talkgroup, and sending a registration acknowledgment to the first communication unit of the second talkgroup. The method may further comprise the steps of detecting a group activity message from each intended talkgroup of a plurality of talkgroups, selecting a third time, broadcasting the third time to the plurality of communication units, and receiving a registration from a non-registered communication unit of the plurality of communication units.

The step of selecting the first time may comprises the steps of determining at least one of: a number of communication units expected to register; a current inbound request load; and a tolerable registration failure rate; and selecting the first time by utilizing at least one of the number of communication units expected to register, the current inbound request load, and the tolerable registration failure rate. The step of selecting the second time or the third time may comprise the steps of determining at least one of: a number of communication units expected to register; a current inbound registration load; a current inbound non-registration load; and a tolerable registration failure rate; and selecting the second time by utilizing at least one of the number of communication units expected to register, the current inbound registration load, the current inbound non-registration load, and the tolerable registration failure rate.

Another method of the present invention comprises the steps of detecting, by a communication unit in a first talkgroup, an elevated registration level of at least a part of a communication system, selecting a first time, determining a first random registration time that is less than or equal to the first time, monitoring for a group activity message for the first talkgroup, and when the group activity message is received before the first random registration time, delaying registration by the communication unit. When the first random registration time occurs before the group activity message is received, the communication unit registers at the first random registration time. The method may additionally comprise the steps of monitoring for a group activity message for a talkgroup other than the first talkgroup, when group activity message for a talkgroup other than the first talkgroup is received, selecting a second time, determining a second random registration time that is less than or equal to the second time, and when a group activity message is received for the first talkgroup before the second random registration time, delaying registration by the communication unit. When the second random registration time occurs before the group activity message is received, the communication unit registers at the second random registration time. The method may further comprise the steps of detecting a group activity message from each intended talkgroup of a plurality of talkgroups, selecting a third time, determining a third random registration time that is less than or equal to the third time, and registering at the third random registration time.

A block diagram of a communication system is shown in FIG. 1. A controller 101, such as a Zone Controller available from Motorola, Inc., controls a communication system comprising at least three communication sites S1, S2, and S3 having three different coverage areas 103, 105, and 107, respectively. At each of these sites is a bank of repeaters or base stations 109 that source multiple communication resources. Distributed throughout the coverage area of a communication system are a number of communication units 111, 113, 115, and 117. If, for example, the site S2 controlling the middle coverage area 105 loses contact with the controller 101 or in some other way is unable to provide wide-area or inter-site communications, all the communication units 111, 113, 115, and 117 that are presently affiliated with the communication site SI supporting coverage area 105 will go to the nearest adjacent site capable of wide-area communications and register. Typically, the communication units 111 and 113 will attempt to register at the first site Si and the communication units 115 and 117 will attempt to register at the third site S3. In the preferred embodiment, registering at a site comprises sending a message including a communication unit identification and a talkgroup identification.

The present invention provides a method of orderly registration by these communication units 111, 113, 115, and 117 such that collisions between the communication units when they try to register will be avoided, while recovering the ability to more efficiently provide communication resources to the communication system. The present invention also provides for an orderly coordination of transmission other types of messages, such as ACKs and NACKs, and all such messages will be referred to as registration messages, and the act of transmitting registration messages will be referred to as registering throughout the specification. Registering comprises transmitting a message comprising at least one of a communication unit identification, a talkgroup identification, and an acknowledgment.

Figure 2:
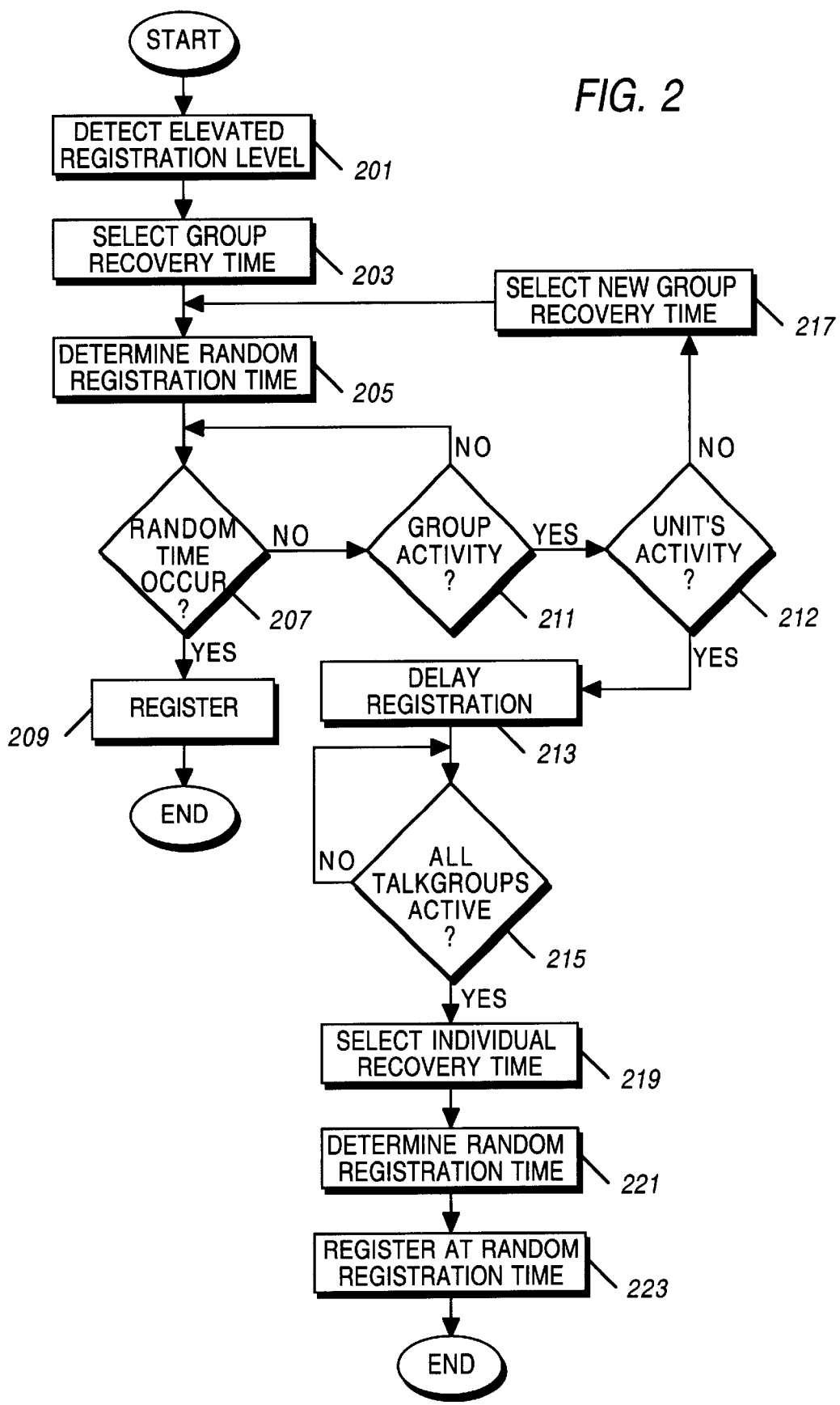
FIG. 2 is a flowchart showing a method of registering multiple communication units in accordance with the invention.

A method of registering multiple communication units is shown in the flowchart of FIG. 2. Many of the steps of the flow chart of FIG. 2 may be performed by either a controller 101 or a communication unit 111. In the preferred embodiment, the controller 101 performs as many steps of the method of FIG. 2 as possible, i.e., by performing the method in the flowchart of FIG. 3, and the communication unit 111 performs the remaining steps. The flowchart of FIG. 2 will be described with respect to a communication unit 111, and those steps that may be performed by a controller 101 will be so designated. At step 201, an elevated registration level is detected. The elevated registration level may occur at one or more sites of the communication system. In one embodiment, such detection comprises detecting the failure of one or more sites in the system. Alternatively, the detection may comprise receiving an indication of the elevated registration level, for example, from controller 101. In addition, the detection may comprise the communication unit 111 determining the registration level of at least part of the communication system, and when the registration level is above a threshold, establishing that the registration level is elevated. The threshold may be, for example, three registration messages per second over a two minute time interval. Step 201 may be performed by a controller 101. The controller 101, in the preferred embodiment, detects an elevated registration level when the failure of one or more adjacent sites is detected, for example, when communications or communication links to an adjacent site are not operational. Alternatively, the controller 101 may receive an indication of the elevated registration level from one of the sites S1, S2, or S3 or a communication unit 111 in the communication system. Further, the detection may comprise the controller 101 determining the registration level in at least part of the communication system, and when the registration level is above a threshold, establishing that the registration level is elevated. The threshold may be the same threshold as used by a communication unit 111.

At step 203, a group recovery time is selected. In this alternative embodiment, the step of selecting a group recovery time may comprise calculating a time large enough for a predetermined number of communication units to register when step 203 is performed by a communication unit 111.

Alternatively, the communication unit 111 may select the group recovery time by extracting the group recovery time from a message received from the controller 101 or another infrastructure entity such as a site controller or intelligent repeater, such as an IntelliRepeater™ base station or repeater available from Motorola, Inc. The group recovery time may be stored in the communication unit 111. The controller may also perform the step of determining the group recovery time at step 203, as described in the description for FIG. 3. The process then continues with step 205, where a random registration time is determined from the group recovery time. Ideally, the random registration time is less than or equal to the group recovery time.

At step 207, it is determined if the random registration time has occurred. If the random registration time has occurred at step 207, the communication unit 111 registers at step 209, and the process ends. If at step 207, the random registration time has not yet occurred, the process continues with step 211, where it is determined if group activity has occurred. Group activity in the preferred embodiment comprises receiving a group activity message such as a registration acknowledgment, a group call message, or a group signalling message. A registration acknowledgement includes a response by the controller to a registration request message. A group call message includes a message indicating that a group call is active at the communication site. Group signalling includes any type of signalling that relates to a group service, such as an emergency alarm message, that indicates an emergency situation is occuring on a particular talkgroup. The group activity message includes an identification of a talkgroup in the preferred embodiment. Detection of such activity may take place by the communication unit 111 monitoring a control channel within the communication system. The controller 101 checks for group activity by observing the control channel at step 211 and through processing of talkgroups from communication registrations or other group activity messages as described above. If there is no group activity at step 211, the process continues with step 207. If there is group activity at step 211, the process continues with step 212, where it is determined if the activity belongs to the talkgroup in which the communication unit 111 belongs. If the talkgroup activity belongs to the unit's talkgroup, the process continues with step 213, where registration is delayed. In the preferred embodiment,registration is delayed for communication units in the talkgroup for which group activity was detected at step 211 for those the communication units 111 that had not yet registered. The delay time may comprise delaying until at least one communication unit from each talkgroup within the plurality of talkgroups in the communication system is registered.

At step 215, it is determined if all the talkgroups intended for use in this communication site are active. Alternatively, one may choose a number of desired talkgroups, such as a number from a simple majority to the total number of talkgroups, in order to accommodate the possibility that one or more talkgroups may not have a member available to register at a new site in a given time period. Talkgroups intended for use are those talkgroups at this communication site that will be initiating or participating in a conversation. Thus, a talkgroup is active when some form of group activity, such as registration by a member of the talkgroup, is detected. A communication unit 111 may make such a determination by setting a timer and detecting expiration of the timer. The time for the timer would be set to an estimate of time taken for each of the talkgroups in the communication unit's system to have activity detected. An alternative method for the communication unit 111 to determine when all talkgroups are active is to determine when no new talkgroup activity occurs over a predetermined time on the control channel. Alternatively, the communication unit may determine when new communication unit registration on the control channel falls below a threshold, such as average registration levels, during a predetermined time period. See FIG. 3 for a description of how step 215 is performed by a controller 101.

If talkgroup activity at step 212 did not belong to the unit's talkgroup, the process continues with step 217, where a new group recovery time is selected. When a communication unit selects the new group recovery time, the new group recovery time may simply be a decreased value from the previous group recovery time, and may be a fixed time. See FIG. 3 for examples of how a controller 101 selects a new group recovery time. In the preferred embodiment, step 215 is performed until all talkgroups are active. Alternatively, step 215 is performed until the desired number of talkgroups are active. If at step 215, all (desired) talkgroups are active, the process continues with step 219, where an individual recovery time is selected. The communication unit 111 may select an individual recovery time in a manner similar to the manner for selecting an initial group recovery time at step 203. The controller 101 may set a time in a manner similar to how it would select a time at step 203. Either the communication unit 111 or the controller 101 may select the individual recovery time at step 219, and such a process is not dependent upon which of these devices determined the group recovery time at step 203. Further, the individual recovery time may be set equal to the original group recovery time from step 203. At step 221, the random registration time is determined by the communication unit, and at step 223, the communication unit registers at the random registration time, and the process ends.

Figure 3:
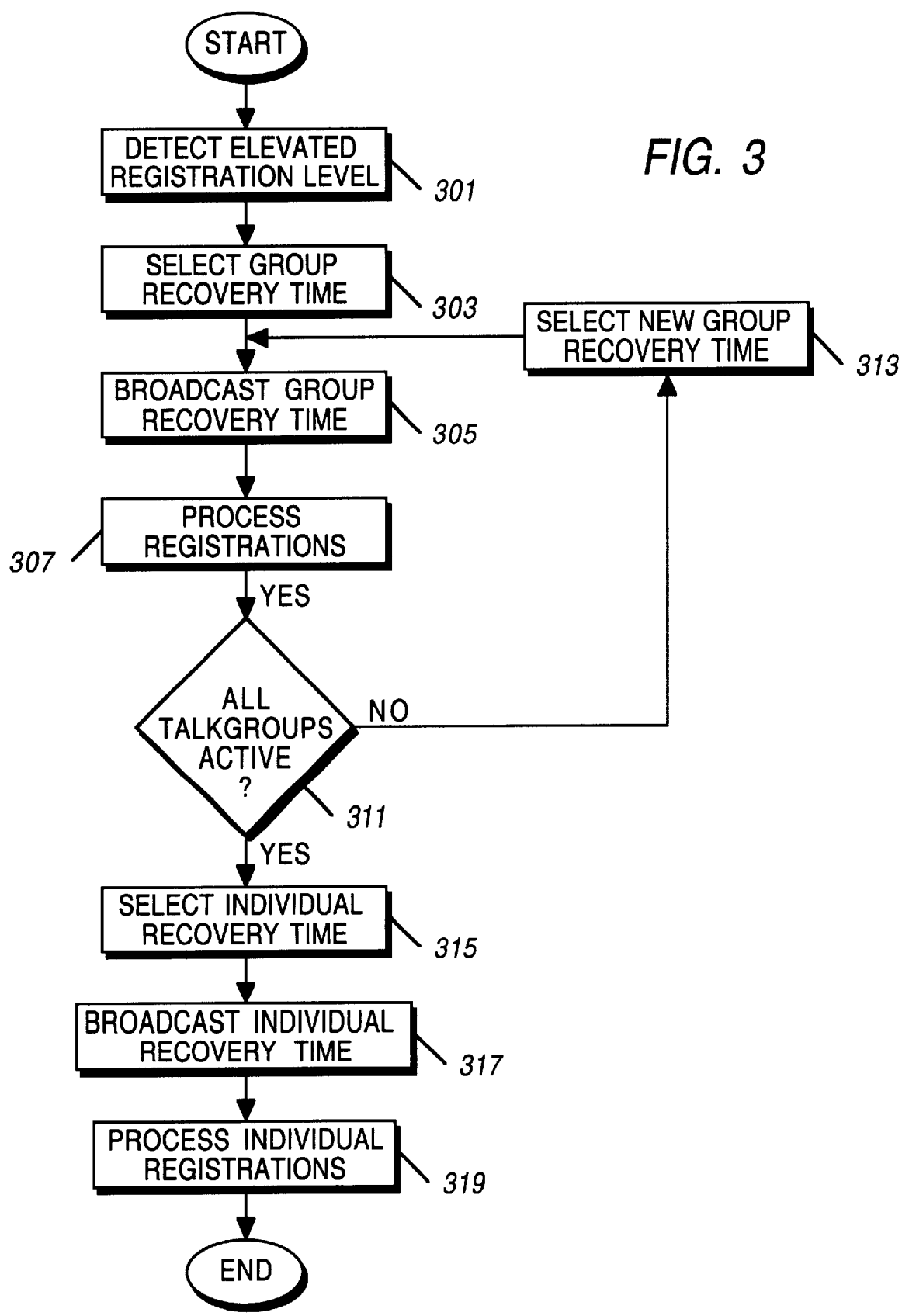
FIG. 3 is a flowchart showing a method of registering multiple communication units as performed by a controller in accordance with the invention.

A method, as may be performed by a controller 101, of scheduling communication unit registration is shown in the flowchart of FIG. 3. At step 301, an elevated registration level is detected by the controller 101. An elevated registration level may be present in only a part of the communication system, such as at one or two of the many sites in a communication system. Elevated levels typically occur when one or more sites of a multiple site communication system fail, loses contact with the rest of the system, or loses the capability of inter-site communications, also referred to as wide-areacommunications. An elevated level may also be assumed for specific times of day, such as a the change of a work shift or in an emergency situation.

At step 303, a group recovery time is selected. In the preferred embodiment, the controller determines the number of communication units expected to register at a particular site, a current inbound request load at the site, and a tolerable registration failure rate. The controller 101 then selects the group recovery time by utilizing the number of communication units expected to register, the current inbound request load, and the tolerable registration failure rate. The following equation may be used:

$$T=a*S/(In(F)-In(c)-a*B),$$

where: T=time value, in seconds; a=constant; S=expected number of communication units to register; F=failure rate, as a percentage (0 to 100, not 0.00 to 1.00); c=constant; and B=baseline traffic load, in messages per second. In the preferred embodiment, the constants have the values a=1.4 and c=0.06. The expected number of communication units can be calculated as follows:

$$S=T*(N-M),$$

where: S=expected number of communication units; T=time value, calculated above; N=new registration rate, in registrations per second; and M=baseline registration rate, i.e., the number of registrations per second prior to the elevated registration level. The formula for T is used first, with a starting value of S, which may be the (total number of communication units)/(number of adjacent sites) in the situation where a site becomes unavailable, or which may be (the total number of communication units at multiple failed sites)/(total number of wide area adjacent sites for the failed sites) when multiple sites become unavailable and the multiple failed sites have a common adjacent wide area site, or an estimate related to the reason for the elevated registration level, such as a message sent to S communication units that requires an ACK from each communication unit. Then, the second formula is used to update the expected number of communication units based on measuring what is going on in the system. To prevent (In(F)–In(c)–a*B) from being negative or 0, in the preferred embodiment, if (In(F)–In(c)–a*B) is less than a small positive value (such as 0.1), then T is set as a large positive value (such as 1000 seconds).

At step 305, the group recovery time selected at step 303 is broadcasted to the appropriate target communication units, such as those at the site for which an elevated registration level was detected at step 301. At step 307, any incoming registrations are processed by the controller 101. The controller 101 may detect group activity by receiving a registration for a talkgroup, processing a group call message, or processing a group signalling message, as described above. The process continues with step 311, where the controller determines if all of the talkgroups intended for use at the site are active. The number of talkgroups intended for use may be all the talkgroups, or a reasonable number given one or more talkgroups may not have a member available to register at a new site. In the preferred embodiment, the controller 101 makes such a determination by waiting until a communication unit has registered for each of the talkgroups that the controller 101 has registered in the system. Such registration may have occurred prior to step 301. The controller may also allow for fewer than all talkgroups to be active, if no activity for inactive talkgroups occurs over a certain period of time.

If all the talkgroups are not presently active at step 311, the process continues with step 313, where the controller selects a new group recovery time, and the process continues with step 305. The new group recovery time may be determined by first determining at least a number of communication units expected to register at the site, a current inbound registration load at the site, a current inbound non-registration load at the site, and a tolerable registration failure rate. The current inbound registration load at the site is the rate at which registration messages are being received, in messages per second. The current inbound non-registration load at the site is the rate at which any other inbound message is received, in messages per second. The tolerable registration failure rate is the percentage of registration messages that can fail and still consider the system to be operating with acceptable performance. The controller 101 then utilizes at least one of the number of communication units expected to register, the current inbound registration load, the current inbound non-registration load, and the tolerable registration failure rate to determine a new group recovery time. This information may be found in a table within the controller, or calculated using an equation, such as the one described above. Typically, the new group recovery time is a shorter time than the previous group recovery time. Once all talkgroups are active at step 311, the process continues with step 315, where an individual recovery time is selected by the controller 101. In the preferred embodiment, the controller 101 determines at least one of the number of communication units expected to register, a current inbound registration load at the site, a current inbound non-registration load at the site, and a tolerable registration failure rate. The controller 101 then utilizes at least one of these factors to yield the individual recovery time at step 315. An equation such as described above may be used. At step 317, the individual recovery time is broadcasted, and individual registrations are processed as is known in the art at step 319, and the process ends. In the preferred embodiment, the steps of the flowchart of FIG. 3 are performed on a site-by-site basis, i.e., for each site where an elevated registration level is detected.

The following describes a particular application for the present invention. Upon detection of a failure of one site S2 of a multiple-site communication system, the controller 101 determines how many communication units 111, 113, 115, and 117 could possibly move to (register at) each of the wide-area sites S1 and S2 adjacent to the failed site S2, by determining the number of communication units registered at the failed site, and dividing that among the number of sites adjacent to the failed site. For the case in which multiple sites have failed and the multiple failed sites have common wide area adjacent sites, the controller 101 determines how many communication units 111, 113, 115, and 117 could possibly move to (register at) each of the wide-area sites S3 adjacent to the failed sites S1 and S2, by determining the number of communication units registered at the failed sites, and dividing that result among the number of wide-area sites adjacent to the failed sites. The controller 101 then broadcasts a group recovery time needed for all communication units to register without colliding. Each of the communication units then determines a random registration time based on the broadcasted group recovery time and registers at the random registration time, unless talkgroup activity for the talkgroup associated with the communication unit is detected before the random registration time for that particular communication unit. If talkgroup activity is detected, all communication units in that talkgroup that have not yet registered will delay registration. Each time talkgroup activity or a new registration with a not yet registered (i.e., affiliated) talkgroup occurs, the controller 101 recalculates a new recovery time to take into account that the recently registered or active talkgroup no longer needs to register to obtain talkgroup resources at that site. This new recovery time will be shorter than the previous group recovery time. Each time activity for a new talkgroup is detected, the group recovery time shrinks until all talkgroups are accounted for in the system. When all the talkgroups have been registered, or have had activity within them in the system, the controller then requests the remaining unregistered communication units 113, 115, and 117, register within the site. Typically, group activity for each of the talkgroups will occur in a time much shorter than the originally calculated group recovery time, and thus all the communication units can participate in talkgroup activity in a much shorter time than if all com munication units had registered, without the need to register. The controller will calculate a new recovery time for the remaining individuals, which time is needed to recover the total number of communication units less those already recovered, via the entire registration process. Typically, approximately one communication unit per talkgroup will have registered during the previous recovery of talkgroups at that site. Hence, the vast majority of the communication units will still need to register with their new site, although the units can participate in group calls until such registration takes place. The controller broadcasts the individual recovery time, and each of the communication units determines a new random time to register based on this individual recovery time, and registers at that new random time.

The present method may be embodied in an individual communication unit 111, without assistance by a controller or other device within the infrastructure of the communication system. In such a method, each of the communication units, upon detection of a site failure or reception of a message containing an indication that an elevated level of registration is presently required in the system. Each communication unit then picks a large random time necessary to recover all the communication units without collisions in the system. This number may be programmed into the communication unit based on load levels known within the communication system. The communication unit then monitors group registrations while waiting to register. If the communication unit that is waiting to register notices a group registration or other talkgroup activity for another talkgroup, the communication unit will decrease the random group registration time based on the level of control channel traffic. Group recovered communication units start an intermediate fixed timer. When the fixed timer expires, the unregistered, remaining, communication units then begin a random individual timer and register when that random individual timer expires.

An advantage of this method is that talkgroups are provided for within the communication system, and talkgroup communications can successfully be performed in the system without need for all the individual communication units to register with the system. When at least one communication unit per talkgroup registers as quickly as possible in the system, the system can allocate resources and direct calls to the individuals in the talkgroups to facilitate communications in the system. Without allocating resources and directing calls to talkgroups, the individuals in the talkgroups would miss communications intended for them. It is advantageous to register these individuals and talkgroups as quickly as possible so that a minimum of communications is missed. Also, this invention controls the rate at which communication units register, thereby optimizing the time it takes to register communication units without overloading the control channel. Other types of messages, such as acknowledgments, may also benefit from the present invention.

What is claimed is:

1. A method comprising the steps of:

detecting an elevated registration level of at least a part of a communication system;

determining a first time;

broadcasting the first time to a plurality of communication units;

detecting a group activity message from at least one talkgroup of a plurality of talkgroups prior to the first time;

after detecting a group activity message from at least some of the plurality of talkgroups, determining a second time, which second time occurs later than the first time;

broadcasting the second time to the plurality of communication units;

receiving a registration from a non-registered communication unit of the plurality of communication units at a time at or before the second time.

2. The method of claim 1, wherein the step of detecting an elevated registration level comprises detecting a failure at one or more sites.

3. The method of claim 1, wherein the step of detecting an elevated registration level comprises receiving an indication of the elevated registration level.

4. The method of claim 1, wherein the group activity message comprises one of a registration acknowledgment, a group call message, and a group signalling message.

5. The method of claim 1, further comprising the step of sending a registration acknowledgment to the non-registered communication unit.

6. The method of claim 1, further comprising the steps of:

detecting a group activity message from each intended talkgroup of a plurality of talkgroups;

determining a third time;

broadcasting the third time to the plurality of communication units;

receiving a registration from a non-registered communication unit of the plurality of communication units.

7. The method of claim 1, wherein the step of determining at least one of the first time and the second time comprises the steps of:

determining at least one of:
a number of communication units expected to register;
a current inbound request load; and
a tolerable registration failure rate; selecting the first time by utilizing at least one of the number of communication units expected to register, the current inbound request load, and the tolerable registration failure rate.

* * * * *